US008650534B2

(12) United States Patent
Kopp et al.

(10) Patent No.: US 8,650,534 B2
(45) Date of Patent: Feb. 11, 2014

(54) METAOBJECT ENHANCEMENT OBJECTS

(75) Inventors: Tilmann David Kopp, Karlsruhe (DE); Ralf Schroth, St. Leon-Rot (DE); Daniel Zoch, Walldorf (DE); Renzo Colle, Stutensee (DE); Thomas Hammer, Walldorf (DE)

(73) Assignee: SAP AG, Walldorf (DE)

( * ) Notice: Subject to any disclaimer, the term of this patent is extended or adjusted under 35 U.S.C. 154(b) by 353 days.

(21) Appl. No.: 12/971,227

(22) Filed: Dec. 17, 2010

(65) Prior Publication Data

US 2012/0005645 A1    Jan. 5, 2012

Related U.S. Application Data

(63) Continuation-in-part of application No. 12/829,617, filed on Jul. 2, 2010.

(51) Int. Cl.
*G06F 17/30* (2006.01)
*G06F 15/16* (2006.01)
*G06F 9/44* (2006.01)
*G06F 9/46* (2006.01)

(52) U.S. Cl.
USPC ........... 717/104; 707/769; 709/219; 709/228; 717/101; 717/114; 717/116; 718/103

(58) Field of Classification Search
None
See application file for complete search history.

(56) References Cited

U.S. PATENT DOCUMENTS

| 6,134,559 | A  | * | 10/2000 | Brumme et al. ............. | 718/103 |
| 6,381,743 | B1 | * | 4/2002  | Mutschler, III ............. | 717/104 |
| 6,874,146 | B1 | * | 3/2005  | Iyengar ..................... | 717/101 |
| 2003/0217121 | A1 | * | 11/2003 | Willis ...................... | 709/219 |
| 2004/0003096 | A1 | * | 1/2004  | Willis ...................... | 709/228 |
| 2004/0003097 | A1 | * | 1/2004  | Willis et al. ............... | 709/228 |
| 2006/0064667 | A1 | * | 3/2006  | Freitas .................... | 717/104 |
| 2008/0010629 | A1 | * | 1/2008  | Berg et al. ................ | 717/116 |
| 2009/0019423 | A1 | * | 1/2009  | Halter et al. .............. | 717/114 |
| 2010/0161648 | A1 | * | 6/2010  | Eberlein et al. ............ | 707/769 |

FOREIGN PATENT DOCUMENTS

| EP | 1 494 131 A1 | 6/2003 |
| WO | 2005/098593 A2 | 10/2005 |

OTHER PUBLICATIONS

Michael G. Bauer et al., The Anchor and Linking Concept of a Meta System for Existing Digital Libraries, 2001, [Retrieved on Oct. 8, 2013]. Retrieved from the internet: <URL: http://www.generalized-documents.org/V3D2/pubs.collection/Omnis2/mik2001-omnis2.pdf> 6 Pages (1-6).*

(Continued)

*Primary Examiner* — Don Wong
*Assistant Examiner* — Anibal Rivera
(74) *Attorney, Agent, or Firm* — Buckley, Maschoff & Talwalkar LLC

(57) ABSTRACT

A system may include acquisition of metadata defining a first object model, the first object model comprising an instance of a metaobject, acquisition of enhancement object metadata defining one or more enhancements to the first object model and associating each of the one or more enhancements with one of one or more stable anchors of the first object model, and creation, based on the metadata defining the object model and the metadata defining the one or more enhancements, of metadata defining an extended object model, the extended object model comprising an instance of the metaobject.

17 Claims, 7 Drawing Sheets

(56) References Cited

OTHER PUBLICATIONS

Andreas Papasalouros et al., Towards a generic conceptual design meta-model for web-based educational applications, 2002, [Retrieved on Oct. 8, 2013]. Retrieved from the internet: <URL: http://users.dsic.upv.es/~west/iwwost02/papers/retalis.pdf> 13 Pages (1-13).*

Willis, G. "Architecture SIG—Feb. 2007", Internet Article, [Online], Feb. 2007, XP002552304, [retrieved on Oct. 26, 2009], Retrieved from the Internet: URL: http://www.acs.org.au/nsw/sigs/architecture//Architecture-200702.pdf>, (pp. 1-44, total 44 pages).

Taylor, M. et al., "Data Integration and Composite Business Services, Part 3: Build a multi-tenant data tier with access control and security", Internet Article, [Online], Dec. 13, 2007, XP002552301, [retrieved on Oct. 26, 2009], Retrieved from the Internet: URL: http://www.ibm.com/developerworks/data/library/techarticle/dm-0712taylor/>, (pp. 1-16, total 16 pages).

Joseph W. Yoder et al., "Architecture and Design of Adaptive Object-Models", ACM SIGPLAN Notices, XP-002249967, vol. 36, No. 12, Dec. 2001, pp. 50-60 (total 11 pgs.).

"European Search Report", dated Oct. 13, 2009, for European Application No. 09011280.6, 2pgs.

"European Search Report of the European Patent Office", mailed Oct. 26, 2009, for EP 09011216.0—1243, 2pgs.

Stefan A. Bauerle et al., U.S. Appl. No. 12/198,315, entitled "Dynamic Extension Fields for Business Objects", filed Aug. 26, 2008.

Stefan A. Bauerle et al., U.S. Appl. No. 12/198,351, entitled "Dynamic Node Extension Fields for Business Objects", filed Aug. 26, 2008.

Stefan A. Bauerle et al., U.S. Appl. No. 12/198,392, entitled "Functional Extensions for Business Objects", filed Aug. 26, 2008.

Gerd M. Ritter et al., U.S. Appl. No. 12/339,328, entitled "Ui-Driven Binding of Extension Fields to Business Objects", filed Dec. 19, 2008.

Peter Eberlein et al., U.S. Appl. No. 12/339,392, entitled "Flexible Multi-Tenant Support of Metadata Extension", filed Dec. 19, 2008.

* cited by examiner

METAOBJECT ENHANCEMENT OBJECTS

CROSS-REFERENCE TO RELATED APPLICATIONS

This application is a continuation-in-part of, claims benefit of and priority to, and incorporates herein by reference for all purposes, U.S. patent application Ser. No. 12/829,617 (filed on Jul. 2, 2010 and under common ownership with the instant application).

FIELD

Some embodiments relate to metaobjects supported by an application platform. More specifically, some embodiments relate to the enhancement of metaobject instances within an application platform.

BACKGROUND

An application platform may execute applications (e.g., business processes) using data modeled on metaobjects. Types of metaobjects include a Business Object, a Business Intelligence View, a Floorplan (i.e., a user interface layout), User Interface Text, a Process Component, and a Message Type, among others. A Business Object-type metaobject, for example, is a software model representing real-world items used during the transaction of business. An instance of a Business Object metaobject may comprise a SalesOrder object model or an Organization object model. Instances of these object models, in turn, represent specific data (e.g., SalesOrder SO4711, ACME corporation).

An instance of a Business Object metaobject may specify business logic and/or data having any suitable structure. The structure may be determined based on the requirements of a business scenario in which the instance is to be deployed. A business application for a particular business scenario may require many business object instances, where the structure of each has been determined based on the requirements of the particular business scenario.

A customer deploying a business solution may desire changes to the Business Object metaobject instances (and/or to the instances of other metaobjects) included in the business solution. For example, a customer may require a field (e.g., Serial Number) which does not exist within the Product object model of a business solution. In addition, another customer may require an additional node or query within the Product object model of the same business solution.

Conventional techniques for adding a field to an existing object model (e.g., an instance of the Business Object metaobject) include APPEND mechanisms which change the definition of the object model at the data dictionary level. This technique requires advanced technical skill and presents other drawbacks as well. For example, an entire database system must be recompiled to effect such a changed definition, and the change occurs globally with respect to all instances of the object model within the system. Moreover, the change may require reprogramming of application clients which interact with the changed object model.

Systems are desired for facilitating the addition of nodes, actions, fields, queries, etc. to object models used in application platforms. These additions may provide increased flexibility to customers. It is desirable that such additions occur at an object model level in order to maintain system coherence and modularity.

DETAILED DESCRIPTION

Figure 1:
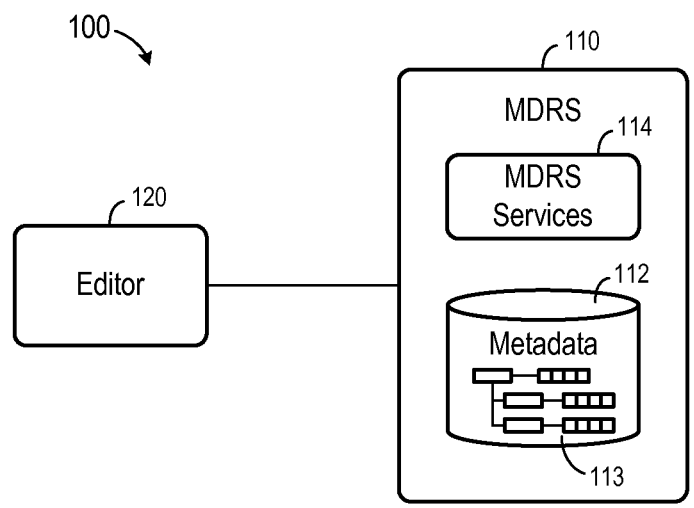
FIG. 1 is a block diagram of a system according to some embodiments.

FIG. 1 is a block diagram of system 100 according to some embodiments. FIG. 1 represents a logical architecture for describing some embodiments, and actual implementations may include more or different components arranged in any manner. System 100 may be implemented using any number of computer devices, and one or more processors may execute program code to perform processes described herein.

System 100 includes metadata repository (MDRS) 110, which in turn includes metadata 112 and MDRS services 114. Metadata 112 includes metadata defining various metadata models 113. These metadata models 113 include metaobjects and instances of the metaobjects, referred to above as object models or objects.

As mentioned above, the metaobjects may include generic models of a business intelligence view, a floorplan, a business object, a user interface text, a process component, and a message type, but embodiments are not limited thereto. Each metaobject of metadata models 113 may comprise an instance of a same meta-metadata model (or meta-metaobject). The meta-metaobject may consist of nodes, composite associations, associations, elements structure and attribute properties. Development of specific metaobjects (and their instances) may therefore proceed using the same development technologies. Moreover, access and lifecycle issues of the various specific metaobjects may be managed using similar (or identical) mechanisms.

Metaobjects and object models, as well as meta-metaobjects described below, may be defined by metadata embodied in any types of electronic data structures, including but not limited to eXtensible Markup Language files. As in the conventional storage of object instance data, the metadata defining the specific metaobjects and object models may be stored in database tables and/or any other suitable format.

Editor 120 may comprise any system to edit metadata 112. Editor 112 may comprise a software application which uses MDRS services 114 to access, change, and add to metadata 112. For example, editor 112 may be used to create an enhancement object model defining one or more enhancements to an associated object model.

Figure 2:
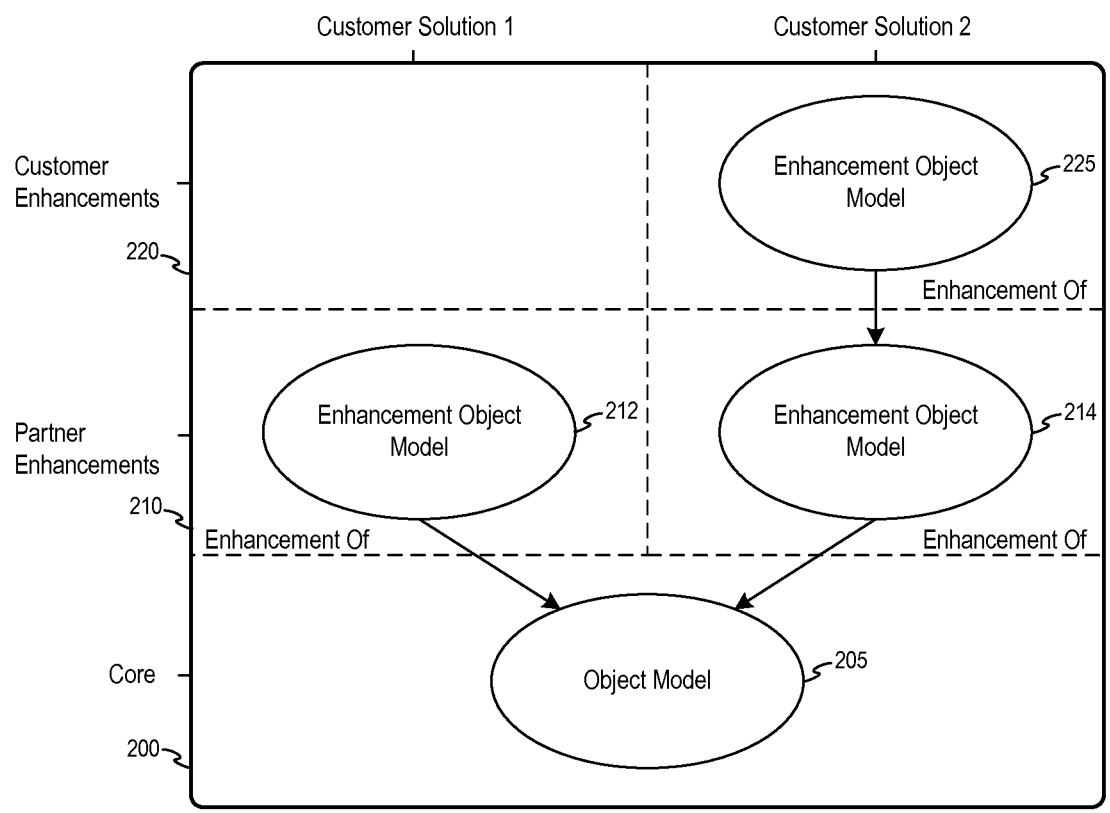
FIG. 2 is a diagram of illustrating design time enhancement objects according to some embodiments.

FIG. 2 illustrates relationships between an object model and various enhancement object models according to some embodiments. As shown, enhancement object models may form hierarchies spanning the responsibility of several parties. Core 200 represents a set of software components provided by an application platform provider. These software components include metadata defining object models, such as object model 205. Object model 205 may, for example, represent a SalesOrder object model, which itself is an instance of a Business Object metaobject.

Partner enhancements 210 include enhancement object models created and maintained by a "partner" (e.g., an industry solution vendor providing core customizations to particular industries). These enhancement object models may include enhancement object models which define enhancements to extensible entities (e.g., nodes, actions, items, etc.) of a core object model. Enhancement object model 212 is a component of Customer Solution 1. As shown, enhancement object model 212 defines one or more enhancements to core object model 205.

Partner enhancements 210 also include enhancement object model 214 of Customer Solution 2. Enhancement object model 214 defines one or more enhancements to core object model 205. Customer Solution 2 further includes enhancement object model 225 of customer enhancements 220. Customer enhancements 220 may be provided by a particular customer, or user, of Customer Solution 2. Enhancement object model 225 may define one or more enhancements to core object model 205 and/or to enhancement object model 214.

Each enhancement object model is related to a base object model (e.g., object model 205). An enhancement object model may enhance other object models along its path to the base object model. For example, enhancement object model 212 may enhance extensible entities of object model 205, enhancement object model 225 may enhance extensible entities of object model 205 and of enhancement object model 214, but, in some embodiments, enhancement object model 225 is not able to enhance extensible entities of enhancement object model 212. Accordingly, some embodiments allow separate managing of development, versioning, testing and transportation for each enhancement object model.

Partner enhancements 210 and customer enhancements 220 may include zero, one, or more than one enhancement object models associated with core object model 205. A single customer solution may include any number of hierarchical enhancement levels (i.e., partner level, customer level, etc.), with each level including zero, one, or more than one enhancement object models for a given core object model. Generally, core 200 may include many core object models, each of which may be associated with zero one, or more than one enhancement object models.

To facilitate the foregoing, an enhancement object model may include only the elements which it adds to a corresponding core object model (i.e., the isolated delta). As a result of delta isolation, changes to the core object model do not automatically invalidate the delta isolation, and multiple enhancement object models can be merged at runtime which were not aware of each other at design time.

An enhancement object model including an isolated delta may be associated with its own modeling, review and activation life cycle. In some embodiments, object models 205, 212, 214 and 225 are instances of a same metaobject (e.g., the Business Object metaobject). Accordingly, the metaobject may include elements to define the extensibility of its instances. Therefore, existing design time applications such as editor 120 may be used to develop the enhancement object models.

During development of a new enhancement object model, such a design time application may present only those entities of a base object model and any intervening enhancement object models which are extensible, or which are relevant to understanding the underlying object model(s). For example, functional entities located above the new enhancement object model in the enhancement hierarchy may be concealed.

Figure 3:
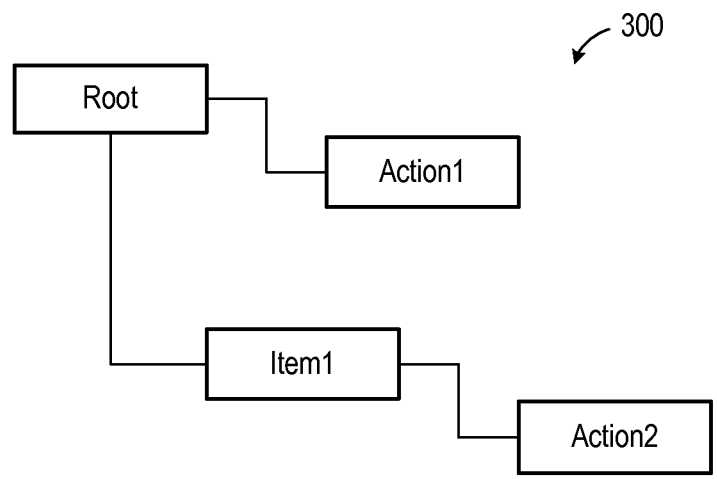
FIG. 3 is a diagram of a core object model according to some embodiments.

FIG. 3 is a diagram of object model 300, which is a simplified instance of a Business Object metaobject. Object model 300 includes two nodes, their data types, and two actions. Object model 300 may be an example of core object model 205 of FIG. 2.

Figure 4:
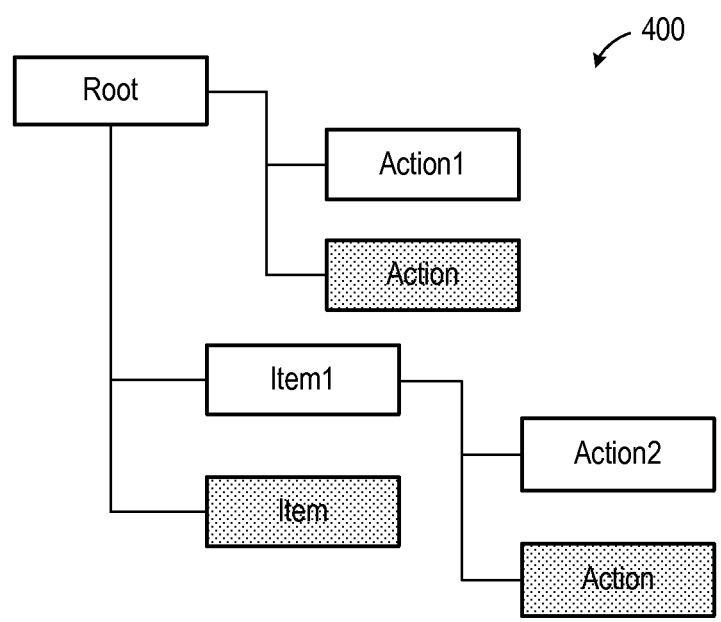
FIG. 4 is a diagram of an extended object model according to some embodiments.

FIG. 4 is a diagram of object model 400, which represents a version of object model 300 including additional nodes and actions. Object model 400 is also an instance of the Business Object metaobject. The enhancements of object model 400 may have been created by an industry solution vendor, a customer, or another entity. Such an object model may be referred to as an "extended" object model.

For system integrity, object model 400 should behave in the same way as if object model 300 had originally included the additional entities. Accordingly, some embodiments prohibit the addition of functionality or structures that could not have been included in object model 300. The reverse does not necessarily hold true, in that certain functionality or structures can be added in the original object model and not in the extended object model.

According to some embodiments, an enhancement object model is used to generate an extended object model based on a given object model. The enhancement object model may define one or more enhancements to the given object model. Such enhancements may include adding instances of structural elements or extensions of existing structural elements as defined by the metaobject of which the given object model is an instance.

As will be described below, a service consumer accessing an instance of the given object model (e.g., object model 300) will be presented with an instance of the extended object model (e.g., object model 400). If multiple enhancement object models corresponding to the given object model are active, all such enhancement object models are merged into the given object model to create an extended object model.

Figure 5:
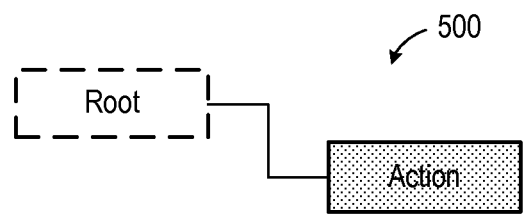
FIG. 5 is a diagram illustrating metadata of an enhancement object model according to some embodiments.
Figure 6:
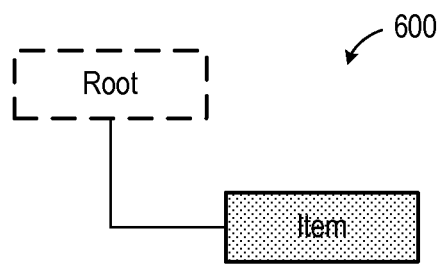
FIG. 6 is a diagram of an enhancement object model according to some embodiments.
Figure 6:
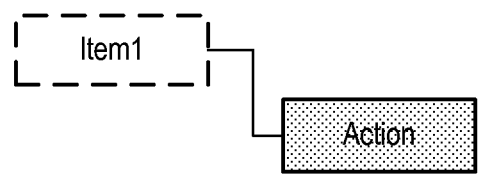

FIGS. 5 and 6 depict enhancement object metadata which may be used to create extended object model 400 based on object model 300. Each of metadata 500 and 600 may define a respective enhancement object model such as the enhancement object models discussed with respect to FIG. 2. Moreover, each of these enhancement object models may comprise an instance of the parent metaobject of object model 300.

Enhancement object metadata 500 defines an enhancement to object model 300 (i.e., an action) and associates the enhancement with an element of object model 300 (i.e., the Root node). Additionally, enhancement object metadata 600 defines two enhancements to object model 300 (i.e., an item and an action) and associates the enhancements with respective elements of object model 300 (i.e., the Root node and Item1).

The elements represented by dashed lines in FIGS. 5 and 6 are referred to as stable anchors. By associating their enhancements with a stable anchor of the object model to be enhanced, metadata 500 and 600 provide delta isolation and enhancement additivity. According to some embodiments, a stable anchor entity may be associated with a persistent object model node and/or an extension field. Stable anchors may be associated with other types of object model entities. A stable anchor may be defined by a system-wide unique identifier and a referenced entity.

Figure 7:
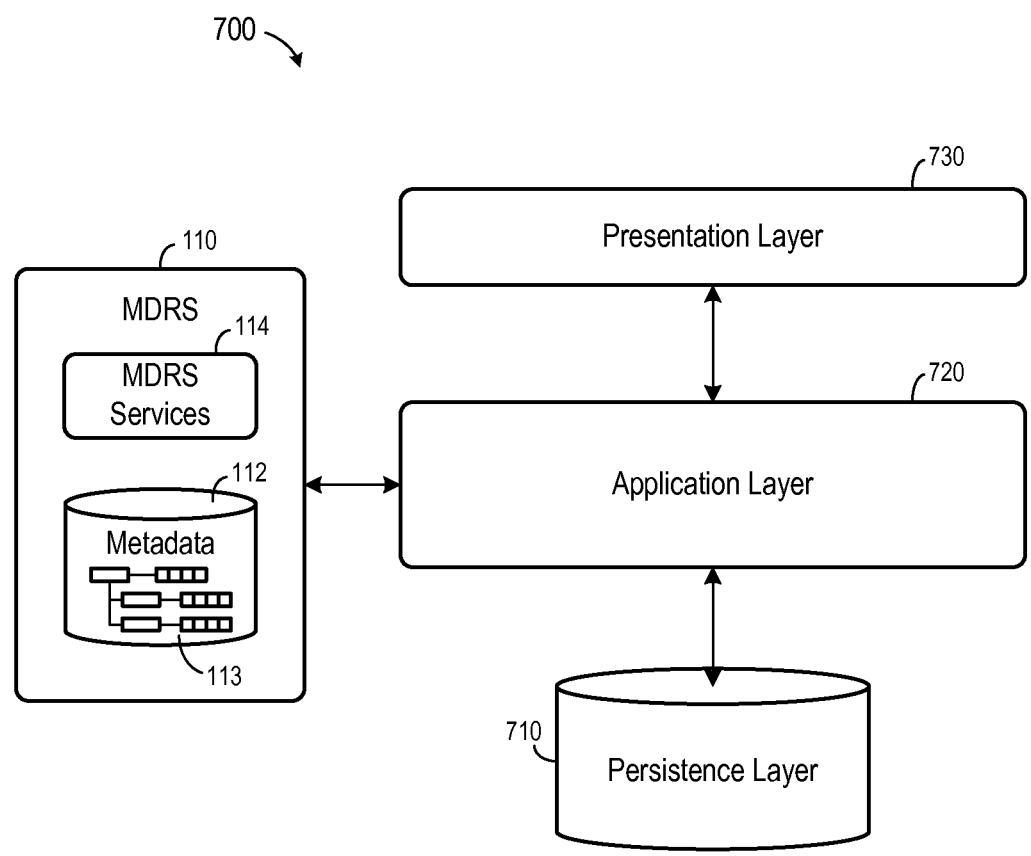
FIG. 7 is a block diagram of a system according to some embodiments.

FIG. 7 is a block diagram of runtime system 700 according to some embodiments. System 700 includes persistence layer 710 which may comprise a relational database system as is known in the art. However, embodiments are not limited thereto. Persistence layer 710 may store object model instance data (e.g., SalesOrder 4711) for customer consumption. Persistence layer 710 may store tenant-specific data which may conform to different tenant-specific enhancement object models.

Application layer 720 provides access to data stored in persistence layer 710. Application layer 720 accesses the data based on metadata models 113 of MDRS 110. Metadata models 113 may include metadata defining metaobjects, core object models, enhancement object models, and/or extended object models. Application layer 720 may also include business logic for providing business functions based at least in part on the data of persistence layer 710.

Presentation layer 730 provides user interfaces for accessing data of persistence layer 710 and/or functions provided by business logic via application layer 720. Any suitable client devices (not shown) may host the user interfaces of presentation layer 730 (i.e., in a rich client architecture) or may access the user interfaces remotely, such as through a Web-based portal.

Figure 8:
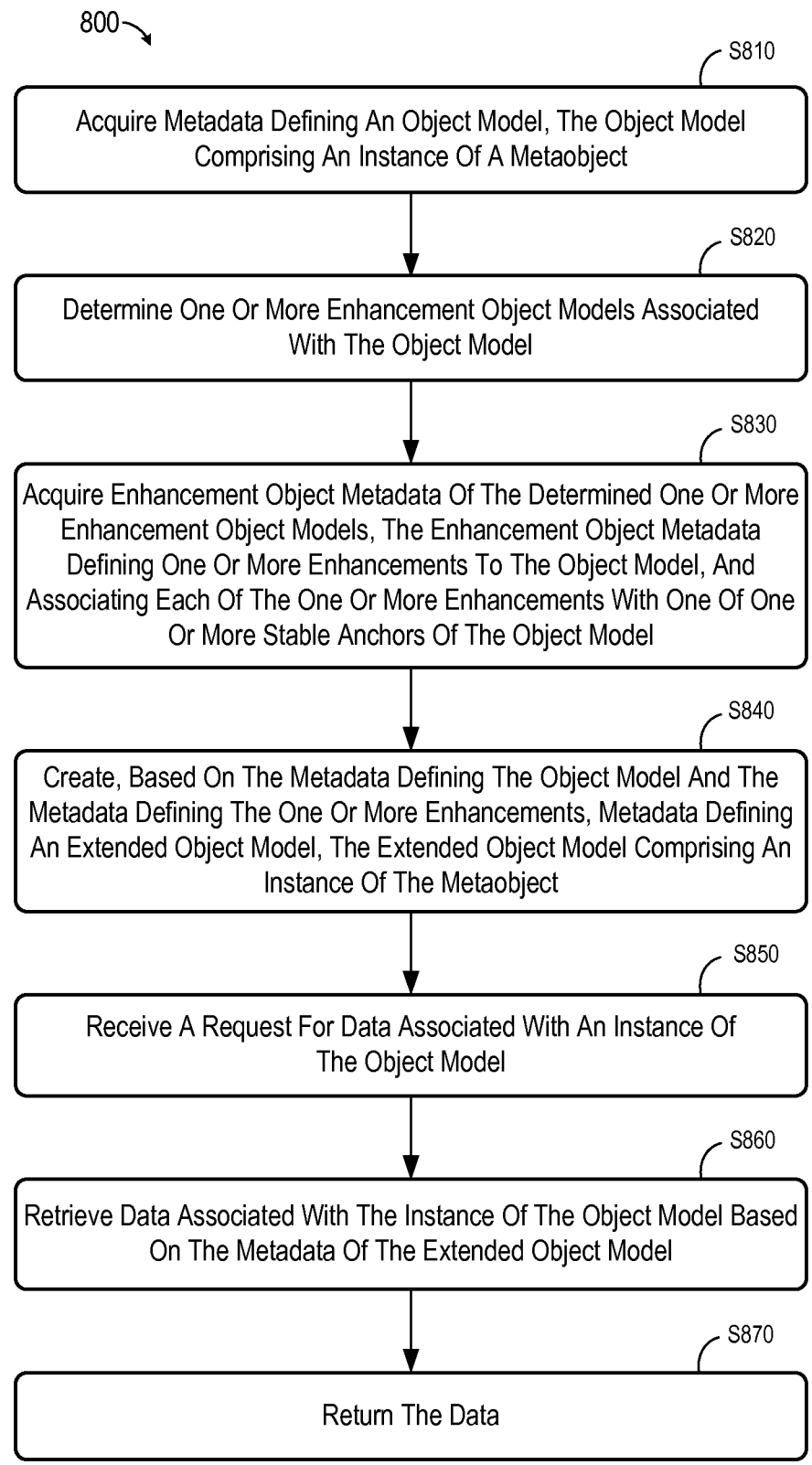
FIG. 8 is a flow diagram of a process according to some embodiments.

FIG. 8 is a flow diagram of process 800 according to some embodiments. Although process 800 will be described with respect to system 700, process 800 may be performed by any system providing extensible object models according to some embodiments. For example, a processor may execute program code to cause performance of process 800.

Initially, at S810, metadata defining an object model is acquired. The defined object model includes extensible entities, and the object model is an instance of a metaobject. With reference to some examples of the above discussion, the object model may be a metadata model 113 defined by metadata 112. The object model may comprise an instance (e.g., a SalesOrder object model) of a Business Object metaobject. The Business Object metaobject may, in turn, include elements which allow instances thereof to define extensible entities. Accordingly, the acquired metadata of the object model may define extensible entities of the object model.

Next, at S820, one or more enhancement object models associated with the object model are determined. The determined enhancement object models may be defined by metadata 112 and may be associated with a particular customer operating system 700. With reference to FIG. 2, enhancement object model 212 may be determined at S820 if the current customer is assigned to Customer Solution 1, and enhancement object models 214 and 225 may be determined at S820 if the current customer is assigned to Customer Solution 2.

Enhancement object metadata of the determined enhancement object models is acquired at S830. The enhancement object metadata defines one or more enhancements to the object model. The enhancement object metadata also associates each of the one or more enhancements with one or more stable anchors of the object model. In one example, metadata of object model 300 is acquired at S810, and enhancement object metadata 500 and 600 is acquired at S830.

Metadata defining an extended object model is created at S840 based on the metadata acquired at S810 and S830. Continuing with the present example, the created metadata may define extended object model 400 of FIG. 4. Advantageously, the extended object model is an instance of the same metaobject of which the original object model is an instance.

At S850, a request for data associated with an instance of the object model is received. The request may be received by application layer 720 from presentation layer 730 in response to an instruction passed thereto by a client device. For example, a client device may request data associated with SalesOrder 4711.

The data is retrieved at S860. However, the data is retrieved based on the extended object model and not based on the original object model. In this regard, metadata of the extended object model stored in MDRS 110 is used to access the appropriate data stored in persistence layer 710. The data is then returned to the requestor at S870.

According to some embodiments, the request is received prior to S810 and the other steps of process 800 are performed in response thereto. Such an implementation maintains separation of the object model and the enhancement object models within metadata models 113 during runtime.

Figure 9:
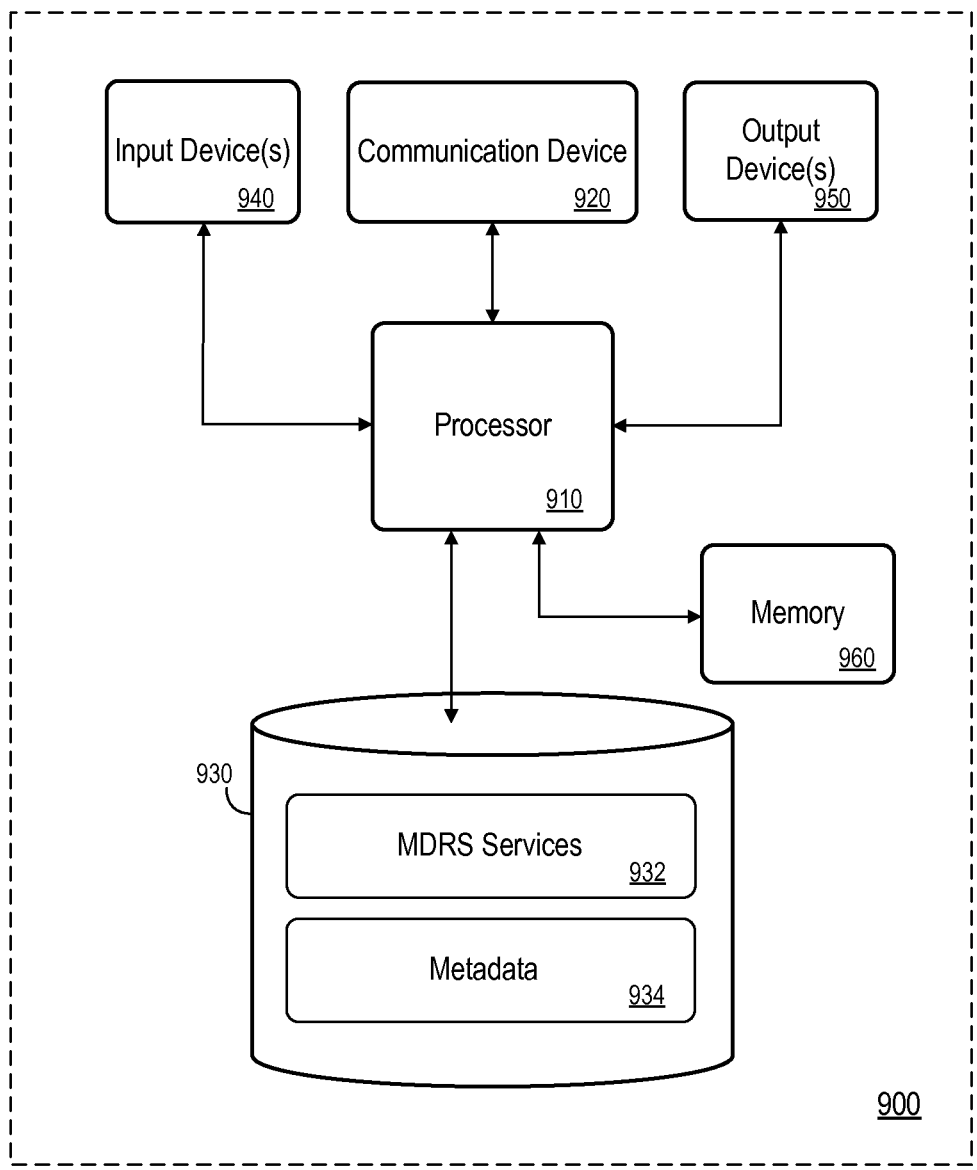
FIG. 9 is a functional block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of MDRS 110. Apparatus 900 may include other unshown elements according to some embodiments.

Apparatus 900 includes processor 910 operatively coupled to communication device 920, data storage device 930, one or more input devices 940, one or more output devices 950 and memory 960. Communication device 920 may facilitate communication with external devices, such as an external design tool. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM).

MDRS services 932 of data storage device 930 includes program code for execution by processor 910 to provide functions described herein, including but not limited to process 800. Embodiments are not limited to execution of these functions by a single apparatus. Metadata 934 may include metadata defining metaobjects (e.g., Business Object metaobject) and instances thereof (e.g., SalesOrder, SalesOrder Enhancement) as described herein. Data storage device 930 may also store data and other program code for providing additional functionality and/or which are necessary for operation thereof, such as device drivers, operating system files, etc.

Each system and device described herein may be implemented by any number of devices in communication via any number of other public and/or private networks. Two or more devices may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

The embodiments described herein are solely for the purpose of illustration. Those in the art will recognize other embodiments may be practiced with modifications and alterations limited only by the claims.

What is claimed is:

1. A method implemented by a computer in response to execution of program code by a processor of said computer, comprising:

acquiring metadata defining a first object model, the first object model comprising an instance of a metaobject;

acquiring enhancement object metadata defining one or more enhancements to extensible entities of the first object model, and associating each of the one or more enhancements with one of one or more stable anchors of the first object model;

acquiring second enhancement object metadata defining a second one or more enhancements to extensible entities of the first object model, and associating each of the second one or more enhancements with a second one of one or more stable anchors of the first object model;

creating, based on the metadata defining the object model and the enhancement object metadata defining the one or more enhancements, metadata defining an extended object model, the extended object model comprising an instance of the metaobject; and creating, based on the metadata defining the object model and the second enhancement object metadata defining the second one or more enhancements, metadata defining a second extended object model, the second extended object model comprising an instance of the metaobject.

2. The method according to claim 1, further comprising:
receiving a request for data associated with an instance of the first object model; and
retrieving data associated with the instance of the first object model based on the metadata defining the extended object model.

3. The method according to claim 2, wherein the enhancement object metadata defines an instance of the metaobject.

4. The method according to claim 1, wherein the enhancement object metadata defines an instance of the metaobject.

5. A method according to claim 1,
determining a first enhancement object models associated with the enhancement object metadata, and a second enhancement object model associated with the second enhancement object metadata,
wherein each of the first and the second enhancement object models comprise instances of the metaobject.

6. The method according to claim 5, wherein enhancement object metadata of each of the first and the second enhancement object models defines a respective enhancement which is associated with a same stable anchor of the first object model.

7. A computer-readable medium having program code stored thereon, the program code comprising:
code to acquire metadata defining a first object model, the first object model comprising an instance of a metaobject;
code to acquire enhancement object metadata defining one or more enhancements to extensible entities of the first object model, and associating each of the one or more enhancements with one of one or more stable anchors of the first object model;
code to acquire second enhancement object metadata defining a second one or more enhancements to extensible entities of the first object model, and associating each of the second one or more enhancements with a second one of one or more stable anchors of the first object model;
code to create, based on the metadata defining the object model and the metadata defining the one or more enhancements, metadata defining an extended object model, the extended object model comprising an instance of the metaobject; and
code to create, based on the metadata defining the object model and the second enhancement object metadata defining the second one or more enhancements, metadata defining a second extended object model, the second extended object model comprising an instance of the metaobject.

8. The computer-readable medium according to claim 7, the program code further comprising:
code to receive a request for data associated with an instance of the first object model; and
code to retrieve data associated with the instance of the first object model based on the metadata defining the extended object model.

9. The computer-readable medium according to claim 8, wherein the enhancement object metadata defines an instance of the metaobject.

10. The computer-readable medium according to claim 7, wherein the enhancement object metadata defines an instance of the metaobject.

11. The computer-readable medium according to claim 7, the program code further comprising:
determining a first enhancement object models associated with the enhancement object metadata, and a second enhancement object model associated with the second enhancement object metadata,
wherein each of the first and the second enhancement object models comprise instances of the metaobject.

12. The computer-readable medium according to claim 11, wherein enhancement object metadata of each of the first and the second enhancement object models defines a respective enhancement which is associated with a same stable anchor of the first object model.

13. A computer-implemented metadata repository comprising:
at least one storage device storing:
first metadata defining a first object model, the first object model comprising an instance of a metaobject;
enhancement object metadata defining one or more enhancements to extensible entities of the first object model, and associating each of the one or more enhancements with one of one or more stable anchors of the first object model;
second enhancement object metadata defining a second one or more enhancements to extensible entities of the first object model, and associating each of the second one or more enhancements with a second one of one or more stable anchors of the first object model;
executable program code of a service to create, based on the metadata defining the object model and the metadata defining the one or more enhancements, metadata defining an extended object model, the extended object model comprising an instance of the metaobject; and
executable program code of a service to create, based on the metadata defining the object model and the second enhancement object metadata defining the second one or more enhancements, metadata defining a second extended object model, the second extended object model comprising an instance of the metaobject; and
a processor to execute the executable program code.

14. The computer-implemented metadata repository according to claim 13, the executable program code of the service further to:
receive a request for data associated with an instance of the first object model; and
retrieve data associated with the instance of the first object model based on the metadata defining the extended object model.

15. The computer-implemented metadata repository according to claim 14, wherein the enhancement object metadata defines an instance of the metaobject.

16. The computer-implemented metadata repository according to claim 13, the executable program code of the service further to:
   determine a first enhancement object models associated with the enhancement object model, and a second enhancement object model associated with the second enhancement object metadata, and
   wherein each of the first and second enhancement object models comprise instances of the metaobject.

17. The computer-implemented metadata repository according to claim 16, wherein enhancement object metadata of each of the first and the second enhancement object models defines a respective enhancement which is associated with a same stable anchor of the first object model.

\* \* \* \* \*